June 26, 1962  E. BAYER  3,040,379
APPARATUS FOR THE CONTINUOUS PRODUCTION OF
ENDLESS SHEETS OF FIBER-REINFORCED
HARDENABLE PLASTICS
Filed June 27, 1960

INVENTOR
ERICH BAYER
BY Burgess Dinklage & Sprung
ATTORNEYS

United States Patent Office 3,040,379
Patented June 26, 1962

3,040,379
APPARATUS FOR THE CONTINUOUS PRODUCTION OF ENDLESS SHEETS OF FIBER-REINFORCED HARDENABLE PLASTICS
Erich Bayer, Wolfsgang Str. 2, Frankfurt am Main, Germany
Filed June 27, 1960, Ser. No. 41,717
Claims priority, application Germany June 27, 1959
7 Claims. (Cl. 18—19)

This invention relates to apparatus for the production of variously corrugated or flat endless sheets and, more particularly, to endless sheets or webs of fiber-reinforced hardened plastics, particularly glass-fiber-reinforced polyester resins.

Only flat or corrugated sheets of fixed dimension can be produced on known apparatus for producing glass-fiber-reinforced polyester foils. Generally, in the continuous production of flat sheets, the resin-impregnated fiber material is provided with thin facing foils and conducted over a slightly curved highly polished surface, heat being applied thereto which causes the resin to set.

In a heretofore proposed device for the continuous production of corrugated sheets, the desired shape is imparted to the sheets by relatively staggered cooperating rolls incorporated in two endless revolving chains. The shape of the resulting corrugation depends upon the diameter of the rolls of the two chains, whereas the thickness of the foil is determined by the thickness of spacing hoops mounted on the ends of the bottom rolls, said hoops supporting the rolls of the upper forming roll chain and maintaining the same a predetermined fixed distance from the bottom rolls. However, sheets with only one given kind of corrugation can be thus produced, the geometry of the corrugation being determined by the diameter of the rolls and the fixed thickness of the spacing hoops.

It is an object of the present invention to overcome the foregoing disadvantages and to provide an apparatus for the improved production of corrugated endless sheets which will permit a wide variety of corrugations, rather than merely one fixed type of corrugation, to be rolled into and imparted to a polyester foil.

Other and further objects of the invention will become apparent from a study of the within specification and accompanying drawings, in which.

Figure 1:
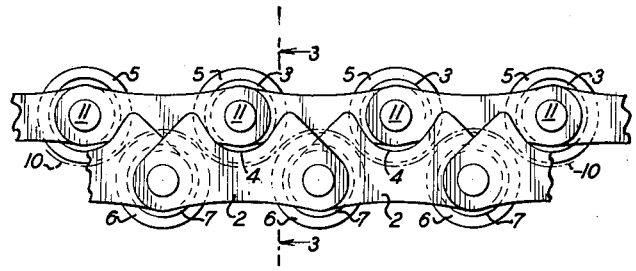
FIG. 1 is a schematic side view of the cooperating rolling chains as they travel in the direction of the arrow through the forming and hardening zone, in accordance with one embodiment of the invention.

According to the invention, it has been found that an improved apparatus for the continuous production of sheets of fiber-reinforced hardenable plastic, particularly of glass-fiber-reinforced polyester resins, may be provided wherein two relatively staggered forming roll chains are arranged between which the plastic-impregnated fiber sheet which is to be hardened is conducted. Significantly, the fiber sheet is passed through a hardening zone within which the two staggered roller chains are situated (e.g., a furnace), the rolls of one forming roll chain being mounted in lobed recesses in the chain links of the other forming roll chain. Desirably, the shape of the chain links and the relative positions of the lobed recesses determine the resultant wave shape of the corrugated hardened plastic sheet.

Preferably, the rolls of the upper rolling chain have necks or end portions of reduced diameter with ball bearings or bearing rollers which run in the lobes of the chain links of the bottom rolling chain. Several, preferably two to four, chain links may be longitudinally mounted side by side on the necks or end portions of the rolls of both rolling chains. Conveniently, the axles of the rolls of the bottom rolling chain are provided with guiding rollers upon which the rolling chains can be conducted through the hardening furnace. Apart from the ball bearings or bearing rollers on the axles of the roll of the upper rolling chain, which rest in the lobed recesses of the several parallel links of the bottom rolling chain, two further bearing rollers may be mounted, one at each end, on said axles of the rolls of the upper rolling chain for riding on the underside of upper guide rails, such guide rails thus retain the rolls, mounted on the same axle between said bearing rollers, in the lobes of the supporting bottom rolling chains.

Whereas the distance between the axles of consecutive rolls in each rolling chain, which is determined by the length of the chain links interconnecting them, fixes the wave length of the corrugation rolled into and imparted to the foil, the depth of the waves is fixed by the depth of the lobed recesses in the supporting bottom rolling chain. The relatively staggered rolls of the two rolling chains conveniently may be so close together that the clearance between their surfaces exactly corresponds with the thickness of the corrugated foil which is to be produced. However, the distance of the upper rolls from the lower rolls may be approximately equal to the diameter of the rolls.

In this connection, for producing different wave shapes and varied configurations, it is also possible to use rolls in one of the chains having a diameter less than the rolls in the other chain. Similarly, consecutive rolls in the same rolling chain, for instance in the lower chain, may have different diameters.

If the lobed recesses in the chain links of one rolling chain are located centrally between the axles of two consecutive rolls in this chain, then the resultant wave shape will be regular, the ascending and descending branches of the corrugation being of equal length. However, the lobed recesses need not be central. They may be located nearer to one of the adjacent axles than to the other. The resultant corrugation will then be asymmetrical, a longer ascending branch being followed by a shorter descending branch. A large variety of wave shapes can thus be produced by the suitable choice of supporting chain links of different shapes and by the appropriate variation of their sequence.

For desirably changing the wave shape of the corrugation, it is merely necessary to replace or interchange the supporting chain links. If the wave length of the corrugation is to be changed, the chain links of both rolling chains must be replaced by links of corresponding lengths. Conveniently, a highly polished bed is provided between the running faces or rails upon which the rolling chains ride through the hardening zone, said polished bed permitting flat sheets to be produced in the same furnace when the rolling chains have been removed.

During their passage through the hardening zone, the rolling chains may be conducted over flat or curved surfaces or over the periphery of a large drum. The heat required for hardening the plastic-impregnated fiber sheet may be applied in conventional manner, for instance by infra-red radiators or by heating the whole of the space surrounding the revolving rolling chains in the hardening zone. In this way, while the continuous sheet is fixed with respect to the staggered rolling chains, during the passage of the rolling chains through the furnace, the particular rolls preferably rotate along on the guiding rollers and upper guide rails, as the case may be, or may be arranged so as not to rotate, in which case only the bearing or guiding rollers rotate.

In order to enable the invention to be more readily understood, reference will now be made to the accompanying drawings, which illustrate diagrammatically and by way of example two embodiments of the invention.

Figure 2:
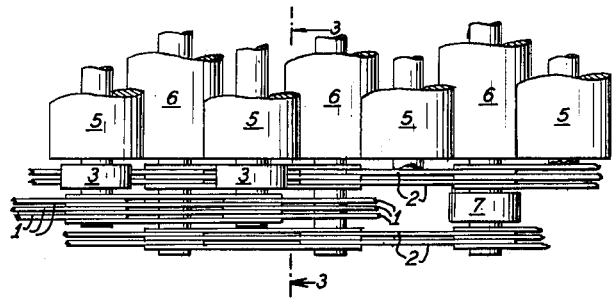
FIG. 2 is a partial plan view of the chains of the embodiment of FIG. 1, a portion of the upper rolling chain being shown broken away.
Figure 3:
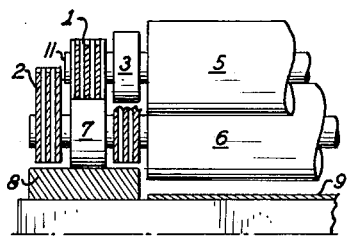
FIG. 3 is a schematic cross section of the rolling chains in accordance with the invention.
Figure 4:
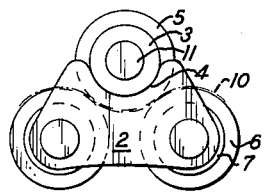
FIGS. 4 and 5 illustrate chain links of various shapes, and show the manner in which corrugations of different wave shapes are produced.

Referring to FIGS. 1 to 4, a sheet 10 which is to be corrugated is conducted through the hardening zone of a furnace, not shown, between two rolling chains comprising relatively staggered rolls 5 and 6. Since the spacing of the rolls in both chains is the same, the links 1 of the upper rolling chain have the same length as the supporting chain links 2 of the lower rolling chain. The forming rolls 5 of the upper rolling chain run in ball bearings or on bearing rollers 3 arranged in symmetrically disposed lobed recesses 4 in the supporting links 2 of the lower rolling chain. Chain links 1, ball bearings 3, and forming rolls 5 are all mounted on the same axle 11. The ball bearings or guiding rollers 7 of the lower rolling chain ride on a running surface 8 which may take the form of a rail. The upper rolling chain may be additionally provided with two further bearing rollers, one at each axle end, coacting with upper guide rails (not shown), or alternatively, the upper guide rails may slidably abut bearings 3 to retain the upper rolling chain, and in turn the rolls, properly in the lobes 4. FIGS. 2 and 3 clearly show the parallel chain links and the manner in which these are mounted. If the upper rolling chain, as shown in FIGS. 2 and 3, is mounted only on the inner links of the double chain, the outer links which provide no support may be of very simple construction, that is to say, they need not be provided with lobed recesses 4. In FIG. 2 ball bearings 7 are omitted from the shafts of all but the right-most roll 6, as viewed by the observer, for ease in understanding details of construction of the remaining relevant parts. In the same way, in FIG. 3, the top portion of inner links 2 on the shaft of roll 6 are partially omitted for ease in understanding the positional relation of the bearing 3 to the remaining relevant parts. FIG. 3 also shows the highly polished bed 9 which serves for the production of endless flat sheets. FIG. 4 shows the link configuration and the relationship of the rollers to produce a particular corrugation shape.

Figure 5:
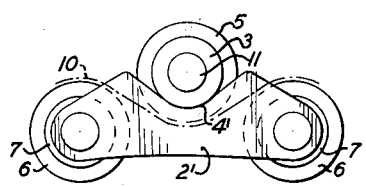

FIG. 5 shows how a corrugation different from that shown in FIGS. 1 to 4 is produced when using chain links 2' and lobed recesses 4' of a different shape for the lower rolling chain.

It will be appreciated that sheet 10 may be disposed in fixed relation between rolls 5 and 6, while these rolls in staggered chain relation pass through the furnace. Rolls 5 and 6 may rotate on their respective axles in contact with corresponding upper and lower guide rails so as to slidably abut the sheet therebetween and, alternatively, rolls 5 and 6 may be maintained in fixed relation with respect to the sheet without rotation, in which case bearing means 3 and 7, or supplemental bearing means mounted on the respective axles, will conveniently rotate against the upper and lower guide rails instead.

What I claim is:

1. Apparatus for the continuous production of corrugated sheets of fiber-reinforced hardenable plastic material, such as glass-fiber-reinforced polyester resins, which comprises two coactive relatively staggered forming roll chains between which the plastic-impregnated fiber sheet which is to be hardened is adapted to be conducted through a hardening zone, each of said roll chains including a plurality of forming rolls and link means for interconnecting said rolls as a chain, the link means of one of said roll chains having lobed recesses defined therein, the rolls of one forming roll chain being mounted in said lobed recesses of the link means of the other forming roll chain, the shape of the link means and the dispositions of the lobed recesses determining the resultant wave shape of the corrugated hardened plastic sheet.

2. Apparatus according to claim 1 wherein said forming roll chains include an upper forming roll chain and a bottom forming roll chain, the forming rolls of the upper forming roll chain being positioned in lobed recesses defined in the link means of the bottom forming roll chain.

3. Apparatus according to claim 2 wherein the forming rolls of the upper forming roll chain are provided with low friction bearing means which engage said lobed recesses.

4. Apparatus according to claim 1 wherein several parallel link means are provided for the rolls of each roll chain.

5. Apparatus for the continuous production of corrugated sheets of hardenable material in a heated hardening zone, which comprises two endless relatively staggered forming roll chains adapted to carry the sheet to be corrugated therebetween, each of said roll chains including a plurality of forming rolls and interchangeable link means for interconnecting said rolls at a predetermined distance apart as a chain, the link means of one of said roll chains having lobed recess means defined therein, the rolls of one forming roll chain being mounted in lobed recess means of the other forming roll chain, said interchangeable link means being adapted to be replaced with corresponding interchangeable link means of different linkage length for interconnecting said rolls at a different predetermined distance apart.

6. Apparatus according to claim 5 wherein said link means having lobed recess means are adapted to be replaced with corresponding link means having lobed recess means of different depth.

7. Apparatus for the continuous production of corrugated sheets of hardenable plastic material in a heated hardening zone, which comprises two endless relatively staggered forming roll chains adapted to carry the sheet to be corrugated therebetween through a hardening zone, each of said roll chains including a plurality of forming rolls and link means for connecting said rolls in spaced apart parallel relation to form an endless chain, the link means of one of said roll chains having lobed recess means defined therein, the rolls of one forming roll chain being mounted in lobed recess means of the other forming roll chain, said lobed recess means being defined in said link means at a predetermined distance between corresponding rolls connected by said link means and at a point in a line normal to the plane passing through the axes of said corresponding rolls, and each of said rolls being of predetermined diameter.

References Cited in the file of this patent

UNITED STATES PATENTS

| 1,483,452 | Keyes | Feb. 12, 1924 |
| 2,350,996 | Atkinson | June 13, 1944 |

FOREIGN PATENTS

| 748,368 | Great Britain | May 2, 1956 |